United States Patent
Segawa et al.

(10) Patent No.: US 7,515,705 B2
(45) Date of Patent: Apr. 7, 2009

(54) FOLDING TYPE PORTABLE TERMINAL

(75) Inventors: Kana Segawa, Ome (JP); Yoichi Nagashima, Hachioji (JP); Tsutomu Arai, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 772 days.

(21) Appl. No.: 11/092,160

(22) Filed: Mar. 28, 2005

(65) Prior Publication Data

US 2006/0183512 A1    Aug. 17, 2006

(30) Foreign Application Priority Data

Jan. 28, 2005    (JP) .............................. 2005-021837

(51) Int. Cl.
*H04M 1/00* (2006.01)
*H04M 9/00* (2006.01)

(52) U.S. Cl. .............................. 379/428.01; 379/433.13; 455/556.1; 455/575.3

(58) Field of Classification Search ............ 379/433.01, 379/433.04, 433.06, 433.1, 433.11, 433.12, 379/433.13; 455/90.3, 556.1, 575.1, 575.3; 348/14.01, 14.07, 552
See application file for complete search history.

(56) References Cited

U.S. PATENT DOCUMENTS

| 2003/0064758 A1 | 4/2003 | Mizuta et al. |
| 2005/0079897 A1 | 4/2005 | Nishijima et al. |

FOREIGN PATENT DOCUMENTS

| CN | 1496181 A | 5/2004 |
| CN | 1525728 A | 9/2004 |
| CN | 1536855 A | 10/2004 |
| JP | 2001-245024 A | 9/2001 |
| JP | 2002-141984 A | 5/2002 |
| JP | 2003-283621 A | 3/2003 |
| JP | 2003-134270 A | 5/2003 |
| JP | 2003-174495 A | 6/2003 |
| JP | 2004-112807 A | 4/2004 |
| JP | 2004-135118 A | 4/2004 |
| JP | 2004-274494 A | 9/2004 |
| JP | 2005-020661 A | 1/2005 |

OTHER PUBLICATIONS

Chinese Office Action (and English translation thereof) dated Feb. 15, 2008, issued in a counterpart Chinese Application.
Japanese Office Action (and English translation thereof) dated May 7, 2008, issued in a counterpart Japanese Application.

*Primary Examiner*—Curtis Kuntz
*Assistant Examiner*—Tuan D Nguyen
(74) *Attorney, Agent, or Firm*—Frishauf, Holtz, Goodman & Chick, P.C.

(57) ABSTRACT

When it is determined that the shells are set in the second state in an automatic activation mode, a TV receiver and TV display application program are activated, and a TV video signal is displayed on the main display. A full-screen display mode of displaying the TV video signal by using the full-screen display area of the main display, and a partial-screen display mode of displaying the display area of the main display by dividing the display area into a TV video display area and additional information display area are prepared. When the TV video signal is to be displayed on the main display, the TV video signal is displayed by using each of the display modes in accordance with the state of the shells.

9 Claims, 8 Drawing Sheets

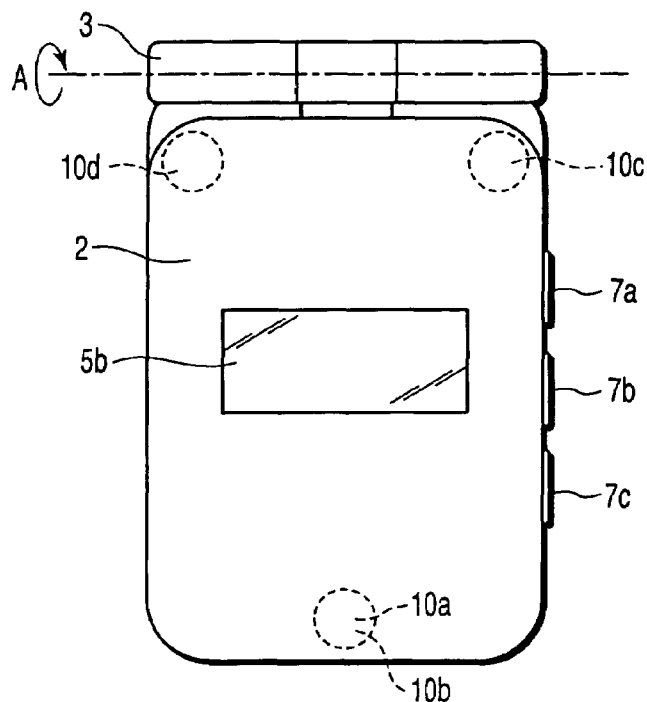 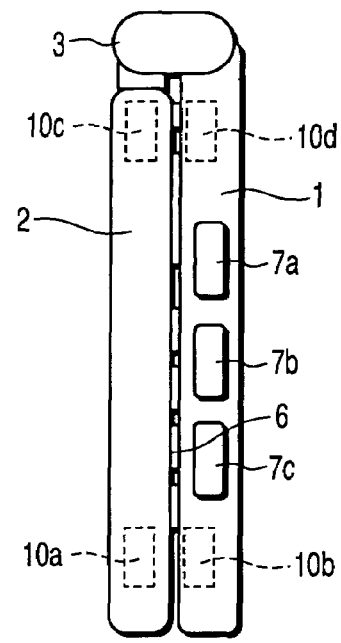
FIG. 1A        FIG. 1B
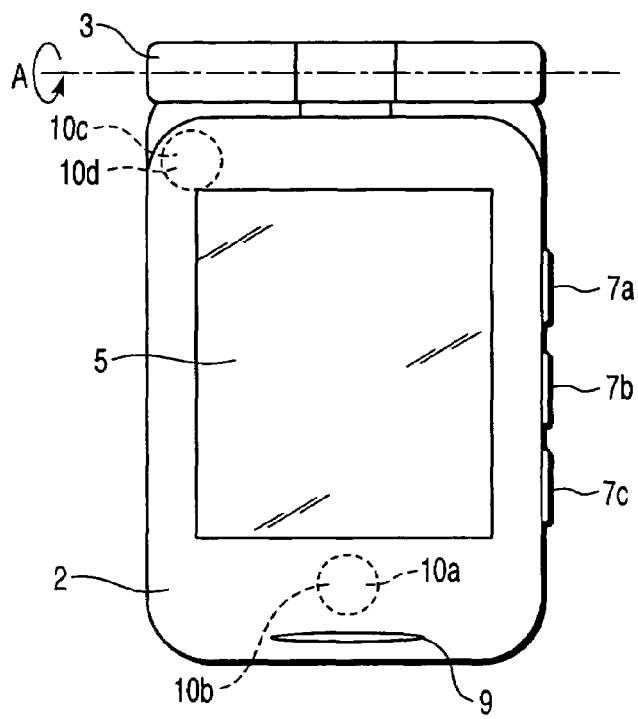 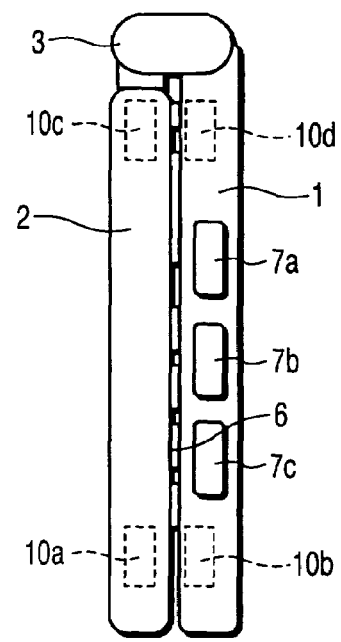
FIG. 5A        FIG. 5B

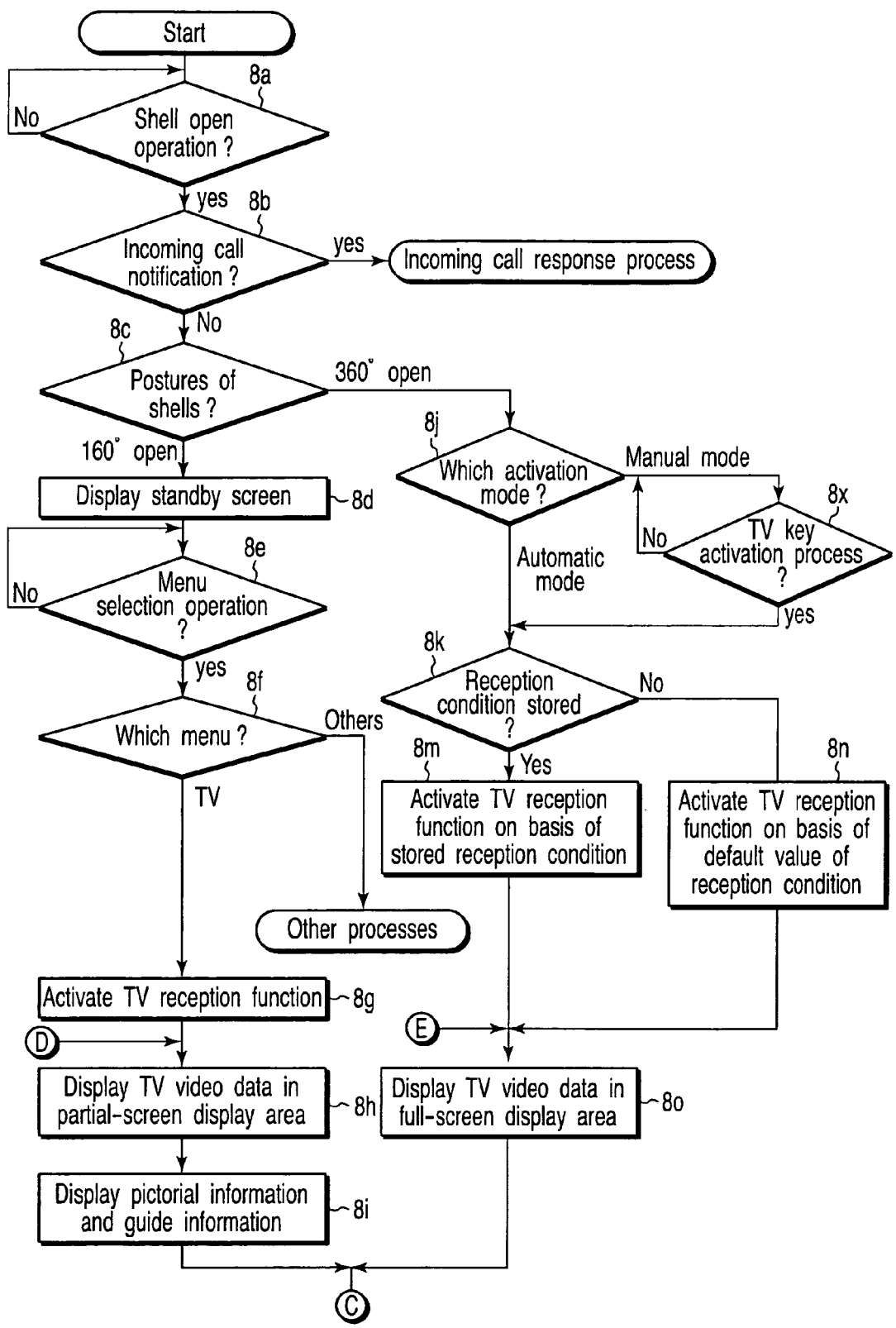
F I G. 7

FOLDING TYPE PORTABLE TERMINAL

CROSS-REFERENCE TO RELATED APPLICATIONS

This application is based upon and claims the benefit of priority from prior Japanese Patent Application No. 2005-021837, filed Jan. 28, 2005, the entire contents of which are incorporated herein by reference.

BACKGROUND OF THE INVENTION

1. Field of the Invention

The present invention relates to a portable terminal such as a mobile telephone or personal digital assistant (PDA) and, more particularly, to a folding-type portable terminal which pivotally connects first and second housings via a hinge mechanism.

2. Description of the Related Art

The mainstream of portable terminals typified by mobile telephones is a so-called folding type mobile telephone obtained by connecting first and second housings via a hinge mechanism. Also, in this type of terminal, not only a terminal with its housings being open and closed from 0° to 180° but also that with a display being facing outside in a state wherein housings overlap each other via a hinge mechanism which is articulated or pivoted 360° have been developed. This type of terminal is described in Jpn. Pat. Appln. KOKAI Publication No. 2002-141984.

Also, a portable terminal which includes a built-in television tuner to have a function of displaying received television video data on a display, and a portable terminal which has a function of playing back recorded data or video content stored in a recording medium such as a memory card or a hard disk have been developed. This type of apparatus allows the user to view a television program and playback the video content while mobile communication is off. Hence, the range of applications for the portable terminal increases.

However, the conventional portable terminal having the above television reception function and the video content playback function generally has a mobile communication function serving as a main function, and the television reception function and the video content playback function serving as sub-functions. Hence, when the television reception function and the video content playback function are to be performed, the user must select these function menus on a menu window by a key operation, and this operation is very cumbersome.

BRIEF SUMMARY OF THE INVENTION

Accordingly, an advantage of an aspect of the present invention to provide a folding-type portable terminal which can easily and quickly activate a video display function such as a television reception function or a video content playback function without any key operation by a user, thus improving operability.

To achieve the above advantage, one aspect of the present invention is to provide a folding-type portable terminal which pivotally connects a first housing having a display to a second housing via a connection mechanism can set a state of the first housing with respect to the second housing in a first state, second state, and third state. The first state is a state wherein the housings overlap each other with the display facing inside, i.e., a state wherein the housings are folded with the display being hidden. The second state is a state wherein the housings overlap each other with the display facing outside, i.e., a state wherein the housings are folded with the display being exposed. The third state is a state wherein the housings are open so that the display is exposed. In accordance with the aspect of the present invention, the portable terminal detects a change in state of the first housing with respect to the second housing. If it is detected that the state has changed from the first or third state to the second state, a image signal is received or read out from a memory to automatically active displaying the video signal on the display.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 1A and 1B are views showing a first state of a mobile telephone as an embodiment of a portable terminal according to the present invention;

FIGS. 5A and 5B are views showing a second state of the mobile telephone as the embodiment of the portable terminal according to the present invention;

FIG. 7 is a flowchart showing the first half of a procedure and contents of a television reception/display control performed by the portable telephone shown in FIG. 6;

DETAILED DESCRIPTION OF THE INVENTION

Figure 2A:
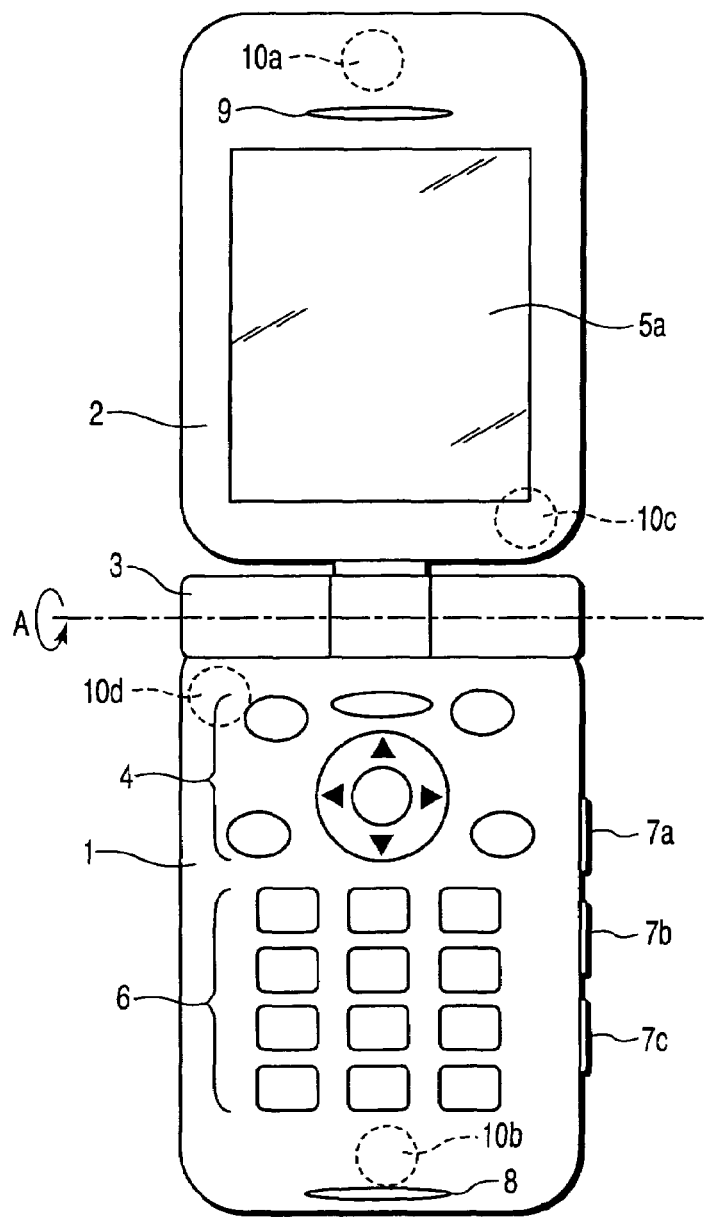
FIGS. 2A and 2B are views showing a third state of the mobile telephone as the embodiment of the portable terminal according to the present invention.

An embodiment of a portable terminal according to the present invention will be described below with reference to the accompanying drawing.

FIGS. 1A and 1B to FIGS. 5A and 5B are views showing the outline of a mobile telephone according to the embodiment of the present invention. In FIGS. 1 to 5, reference symbols A and B denote front and side views, respectively.

This mobile telephone is a portable communication terminal obtained by connecting first and second housings 1 and 2 via an articulated hinge mechanism 3. Note that the first and second housings 1 and 2 are referred to as shells hereinafter.

On the front of the first shell 1, an input device and microphone hole 8 are formed. The input device includes dial keys 6, function keys 4, side key 7a, and TV key 7c. The side key 7a and the TV key 7c are arranged on the side of the first shell 1. The function keys 4 include a multifunction key having the functions of a transmission key, end key, scheduling key, clear key, and cursor keys. The TV key 7c is used to activate a television reception function.

A main display 5a and a loudspeaker hole 9 are formed on the front of the second shell 2, and a sub-display 5b and a camera (not shown) are arranged on the back of the second shell 2. Each of the main display 5a and sub-display 5b includes a backlight on the back side of a liquid crystal display (LCD) panel. The main display 5a is used to display all display data such as phone book data, television video data, camera video data, mail data, and pictorial information. Alternatively, the sub-display 5b is mainly used to display the pictorial information.

The articulated hinge mechanism 3 has a function of pivoting the second shell 2 in the direction of an arrow A with respect to the first shell 1, and that of pivoting the second shell 2 in the direction of an arrow B with respect to the first shell 1. This articulated hinge mechanism 3 can change the state of the shells 1 and 2 as follows.

Figure 2B:
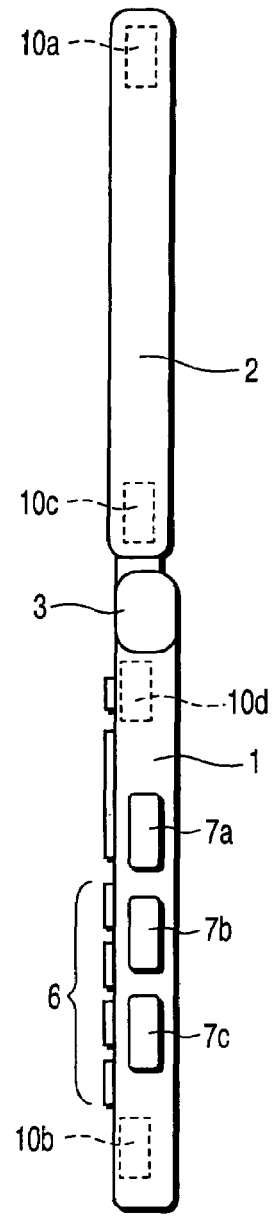
Figures 3A, 3B:
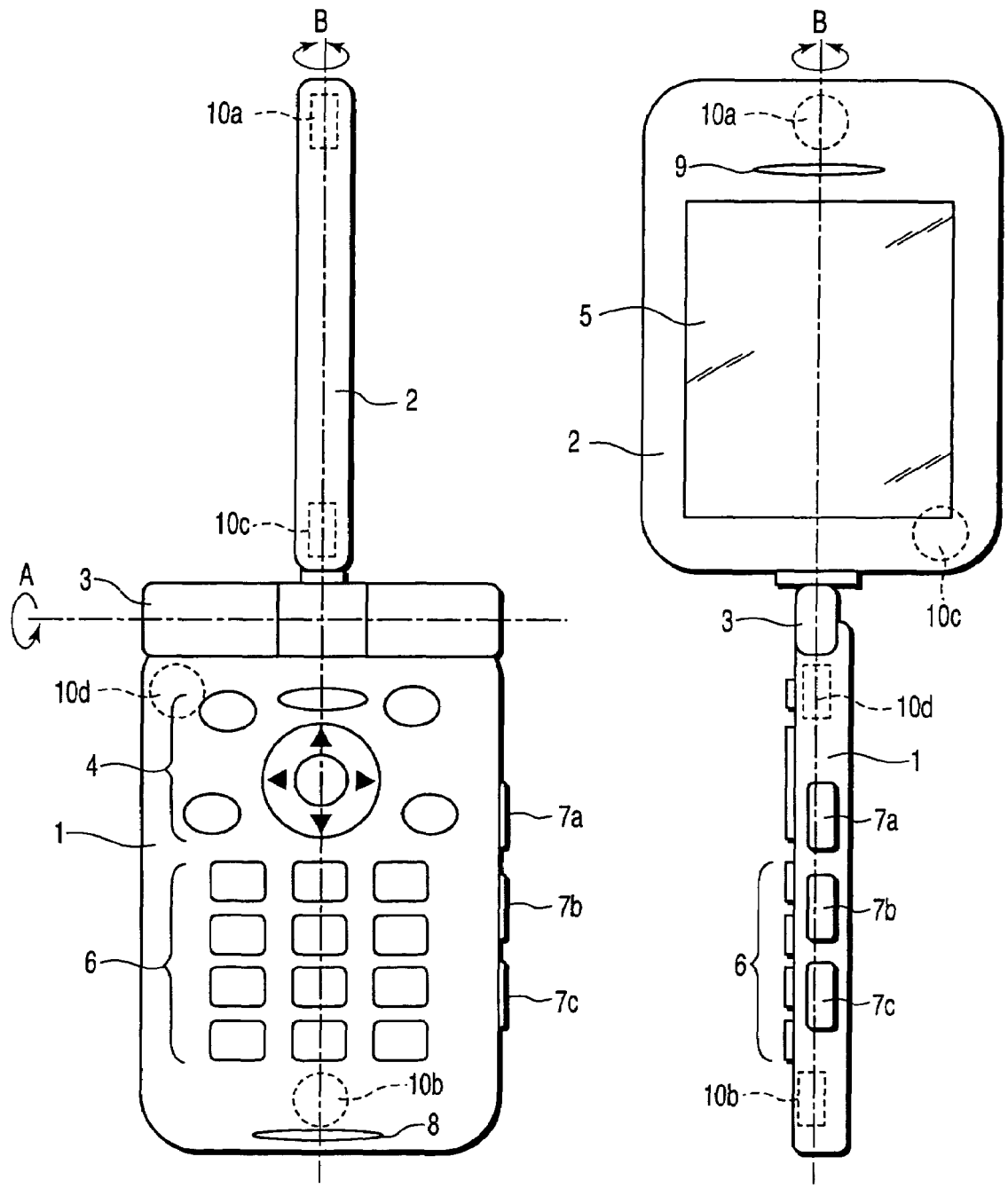
FIGS. 3A and 3B are views showing a fourth state of the mobile telephone as the embodiment of the portable terminal according to the present invention.
Figure 4B:
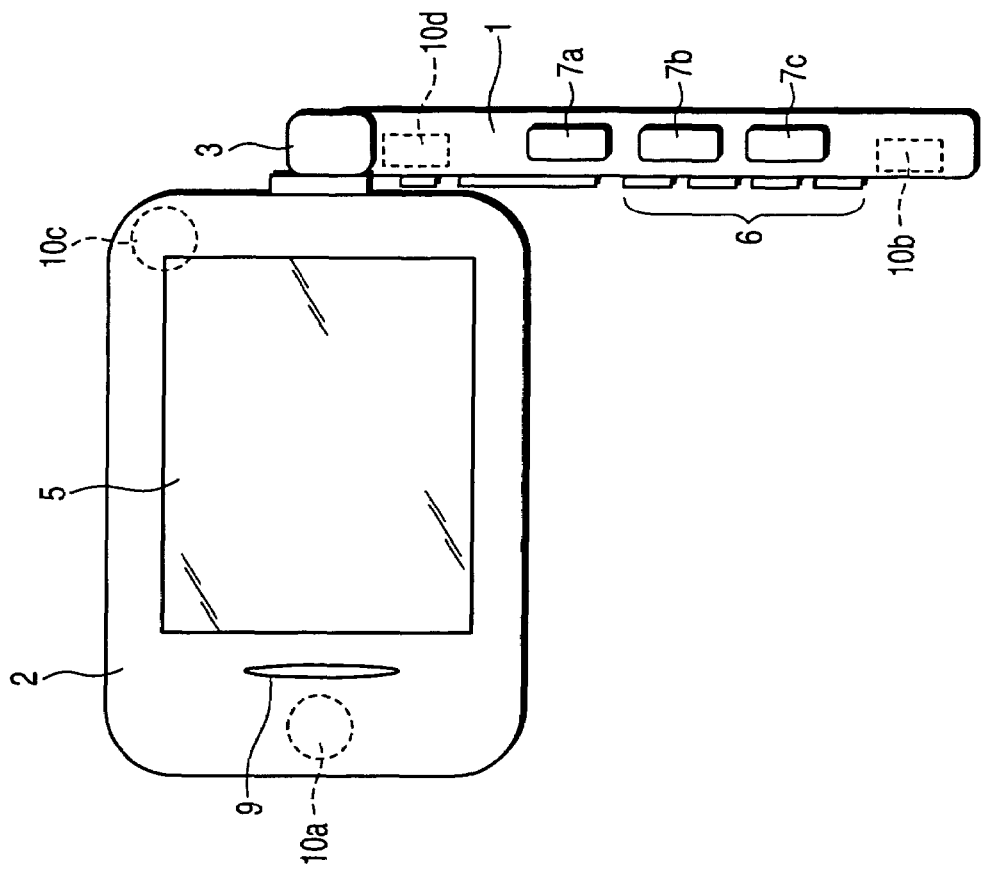
FIGS. 4A and 4B are views showing fifth state of the mobile telephone as the embodiment of the portable terminal according to the present invention.
Figure 4A:
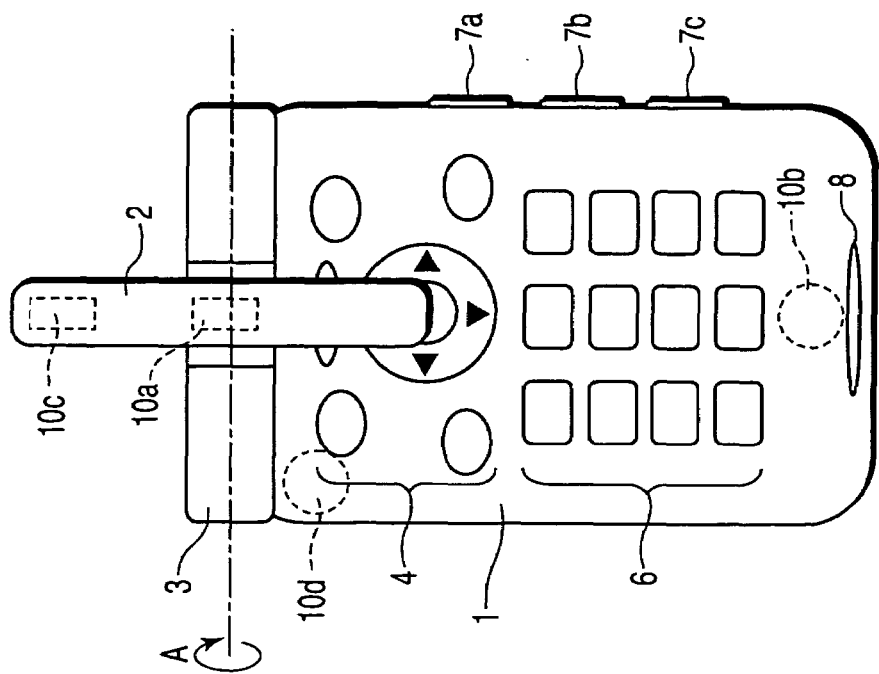

That is, FIGS. 1A and 1B show a state (first state) wherein the shells 1 and 2 overlap each other with the main display 5a facing inside. FIGS. 2A and 2B show a state (third state) wherein the second shell 2 is pivoted in the direction of the arrow A to obtain a 160° open state with respect to the first shell 1 to expose the dial key 6, function keys 4, and main display 5a. FIGS. 3A and 3B show a state (fourth state) wherein the second shell 2 is pivoted in the direction of the arrow B from the above third state to obtain a 90° open state. FIGS. 4A and 4B show a state (fifth state) wherein the second shell 2 is pivoted in the direction of the arrow A from the above fourth state to obtain a 90° open state. FIGS. 5A and 5B show a state (second state) wherein the second shell 2 is pivoted through 90° in the direction of the arrow B from the above fifth state, and then pivoted in the opposite direction of the arrow A to cause the shells 1 and 2 to overlap each other with the main display 5a facing outside.

Also, the first and second shells 1 and 2 include sensors 10a to 10d for detecting the state of the shells 1 and 2. Each of the sensors 10a to 10d comprises, e.g., a magnetic sensor to output a detection signal in the state wherein the sensors are close to each other in a predetermined distance. Of the sensors 10a and 10d, the pair of sensors 10a and 10b are used to check whether the mobile telephone is in a state wherein the first and second shells 1 and 2 overlap each other (i.e., the above first state or second state), or any other states. The pair of sensors 10c and 10d are used to check whether the mobile telephone is in the first state or second state.

Figure 6:
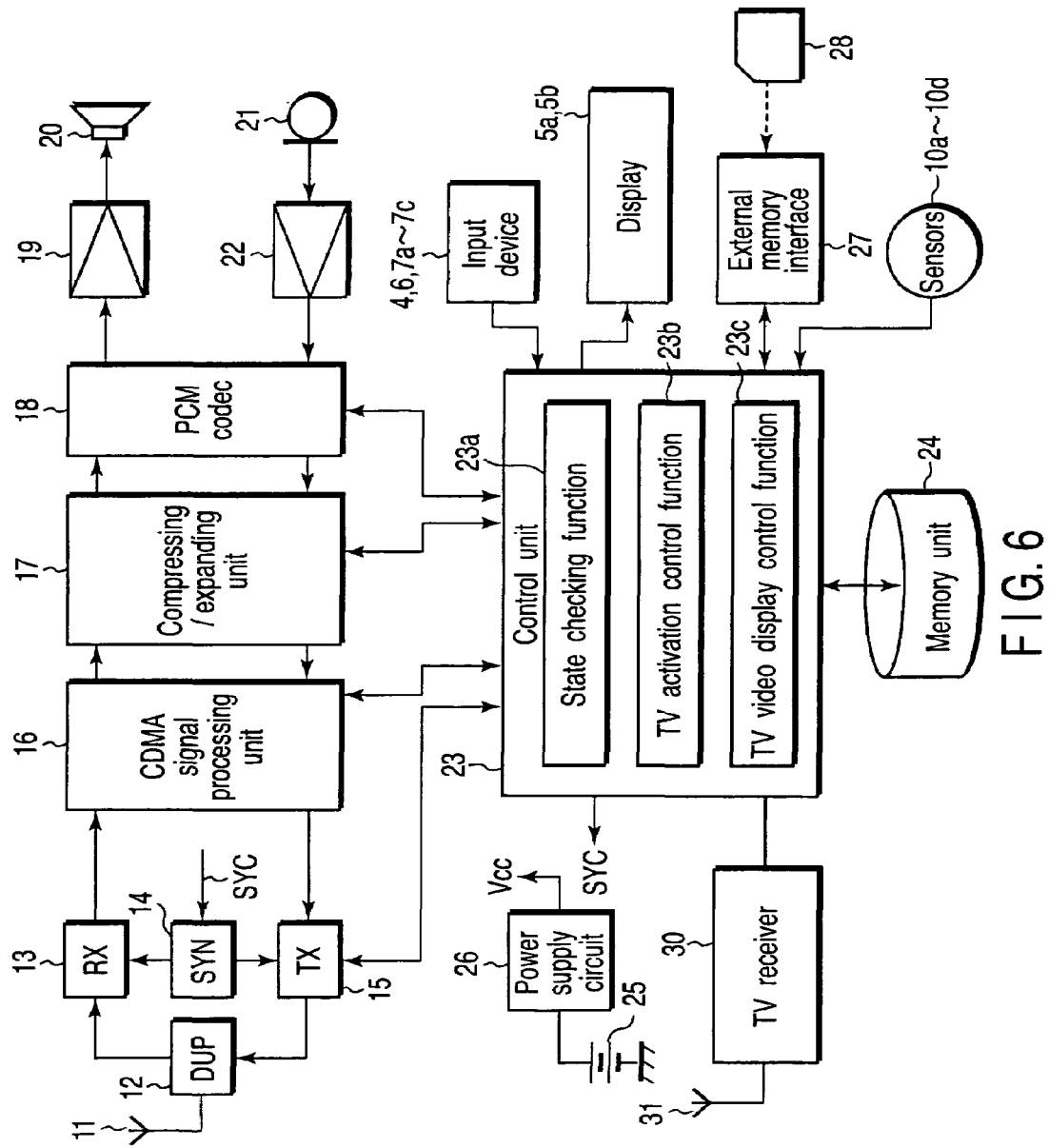
FIG. 6 is a block diagram showing a circuit configuration of the mobile telephone as the embodiment of the portable terminal according to the present invention.

The circuit of the mobile telephone is arranged as follows. FIG. 6 is a block diagram showing a circuit configuration of the mobile telephone.

That is, a radio signal transmitted from a base station (not shown) is received by an antenna 11, and input to a receiving circuit (RX) 13 via a duplexer (DUP) 12. The receiving circuit 3 mixes the received radio signal with a local oscillation signal output from a frequency synthesizer (SYN) 14, thereby down-converting the signal into an intermediate-frequency signal. The receiving circuit 3 processes this intermediate-frequency signal by quadrature demodulation, and outputs a reception baseband signal. Note that the frequency of the local oscillation signal generated by the frequency synthesizer 14 is designated by a control signal SYC output from a control unit 23.

The reception baseband signal is input to a CDMA signal processing unit 16. The CDMA signal processing unit 16 includes a RAKE receiver. The RAKE receiver despreads a plurality of passes included in the reception baseband signal by using spread codes. The signals of these despread passes are synthesized after their phases are arbitrated. In this manner, reception packet data having a predetermined transmission format is obtained. This reception packet data is input to a compressing/expanding) unit (to be referred to as a compander hereinafter) 17.

The compander 17 demultiplexes the output reception packet data from the CDMA signal processing unit 16 into media data by a multiplexer/demultiplexer. The compander 17 individually decodes these demultiplexed media data. For example, in a speech mode, audio data such as speech contained in the reception packet data is decoded by a speech codec. Also, if video data is contained in the reception packet data as in a videophone mode, this video data is decoded by a video codec.

A digital audio signal obtained by the decoding process is input to a PCM coding unit (to be referred to as a PCM codec hereinafter) 18. The PCM codec 18 decodes, by PCM, the digital audio signal output from the compander 17, and outputs an analog audio signal. This analog audio signal is amplified by an amplifier 19, and output from a loudspeaker 20.

Note that when an audio playback mode is set, the control unit 23 reads corresponding audio contents from a memory unit 24. The read audio contents is decoded, amplified, and output from the loudspeaker 20 via the PCM codec 18 and the reception amplifier 19.

A digital video signal decoded by the compander 17 is input to the control unit 23. The control unit 23 displays the digital video signal output from the compander 17 on the main display 5a via a video RAM. Note that the control unit 23 displays not only received video data but also video data of an image sensed by a camera (not shown) on the main display 5a via the video RAM.

When the reception packet data is e-mail, the compander 17 outputs this e-mail to the control unit 23. The control unit 23 stores the e-mail in the memory unit 24. In accordance with a display operation performed on the input device 5 by the user, the control unit 23 reads the e-mail from the memory unit 24, and displays the read e-mail on the main display 5a. Note that the sub-display 5b displays information indicating the operation mode of the apparatus, incoming call notification information, and information indicative of the residual amount or charged state of a battery 25.

A speech signal of a speaker input to a microphone 21 in the speech mode is amplified to an appropriate level by a transmission amplifier 22, coded into a digital audio signal by PCM by the PCM codec 18, and input to the compander 17. Also, an output video signal from the camera (not shown) is converted into a digital signal by the control unit 23, and input to the compander 17. Note that e-mail formed by the control unit 23 is also input from the control unit 23 to the compander 17.

The compander 17 detects the energy amount of the input speech from the digital audio signal output from the PCM codec 18, and determines a transmission data rate on the basis of the detection result. Then, the compander 17 codes the digital audio signal into a signal having a format corresponding to the transmission data rate, thereby generating audio data. Also, the compander 17 codes the digital video signal output from the control unit 23, and generates video data. The multiplexer/demultiplexer multiplexes these audio data and video data in accordance with a predetermined transmission format to generate transmission packet data, and outputs this transmission packet data to the CDMA signal processing unit 16. Note that when e-mail is output from the control unit 23, this e-mail is also converted into packet data.

The CDMA signal processing unit 16 spreads the spectrum of the output transmission packet data from the compander 17 by using a spread code allocated to a transmission channel, and outputs the signal to a transmitting circuit (TX) 15. The transmitting circuit 15 modulates the signal having the spread spectrum by using a digital modulation method such as quadrature phase shift keying (QPSK). The transmitting circuit 15 synthesizes the modulated transmission signal with the local oscillation signal generated from the frequency synthesizer 14, thereby up-converting the signal into a radio signal. Then, the transmitting circuit 15 amplifies the radio signal to a high frequency so that the transmission power level designated by the control unit 23 is obtained. The amplified radio signal is supplied to the antenna 11 via the duplexer 12, and transmitted from the antenna 11 to the base station.

The mobile telephone of this embodiment includes a television receiver (TV receiver) 30. The TV receiver 30 receives, e.g., a terrestrial television video signal via an antenna 31, and converts the received television video signal into a digital television video signal. The control unit 23 displays this television video signal on the main display 5a.

The mobile telephone of this embodiment also includes an external memory interface 27. This external memory interface 27 has a slot for the insertion and extraction of a memory card 28. Under the control of the control unit 23, the video content data are read out from the memory card 28 inserted in the slot. The control unit 23 decodes and plays back the readout video content data, and displays the data on the main display 5a.

A power supply circuit 26 generates, from an output from a battery 25, a predetermined operating power supply voltage Vcc, and supplies this voltage to the individual circuits. Note that the battery 25 is charged by a charging circuit (not shown). The memory unit 24 uses, e.g., an EEPROM or hard disk as a memory unit.

The control unit 23 includes, e.g., a microcomputer (central processing unit [CPU]). As control functions according to the present invention, the control unit 23 has a state checking function 23a, TV activation control function 23b, and TV video display control function 23c. These functions are implemented by allowing the microcomputer to execute programs.

The state checking function 23a checks the state of the first and second shells 1 and 2 on the basis of detection signals output from the sensors 10a to 10d. For example, on the basis of the detection signals from the sensors 10a and 10b, the state checking function 23a checks whether the state of the first and second shells 1 and 2 is in the first state (FIGS. 1A and 1B), the second state (FIGS. 5A and 5B), or any other states (e.g., the third state shown in FIGS. 2A and 2B). Alternatively, on the basis of the detection signals from the sensors 10c and 10d, the state checking function 23a checks whether the state of the first and second shells 1 and 2 is in the first state (FIGS. 1A and 1B), or the second state (FIGS. 5A and 5B).

The TV activation control function 23b includes manual and automatic activation modes as a TV activation mode to alternatively set these modes in accordance with the user's selection. When the state checking function 23a determines that the state of the shells 1 and 2 is in the second state (FIGS. 5A and 5B) in the automatic activation mode, the TV receiver 30 is automatically activated.

When the television video signal received by the TV receiver 30 is to be displayed on the main display 5a, the TV video display control function 23c selects a full-screen or partial-screen display mode on the basis of the shell state check result obtained by the state checking function 23a. For example, when the state of the shells 1- and 2 is in the second state (FIGS. 5A and 5B), the TV video display control function 23c selects the full-screen display mode. The full-screen display area of the main display 5a is set as a television video display area to display the television video signal on this full-screen display area. In this case, the display direction of the television video signal is set so that the main scanning direction of the signal is the long-side direction of the full-screen display area of the main display 5a.

Alternatively, when the state of the shells 1 and 2 is in the third state (FIGS. 2A and 2B), the TV video display control function 23c selects the partial-screen display mode. A TV video display area 51 is set at the center in the vertical direction of the main display 5a, and the television video signal is displayed on this TV video display area 51. In this case, the display direction of the television video signal display is set so that the main scanning direction is the short-side direction of the full-screen display area of the main display 5a. Additionally, additional information display areas 52a and 52b are set on the upper and lower portions in the vertical direction of the main display 5a. The pictorial information and guide information are displayed in the additional information display areas 52a and 52b.

Figure 8:
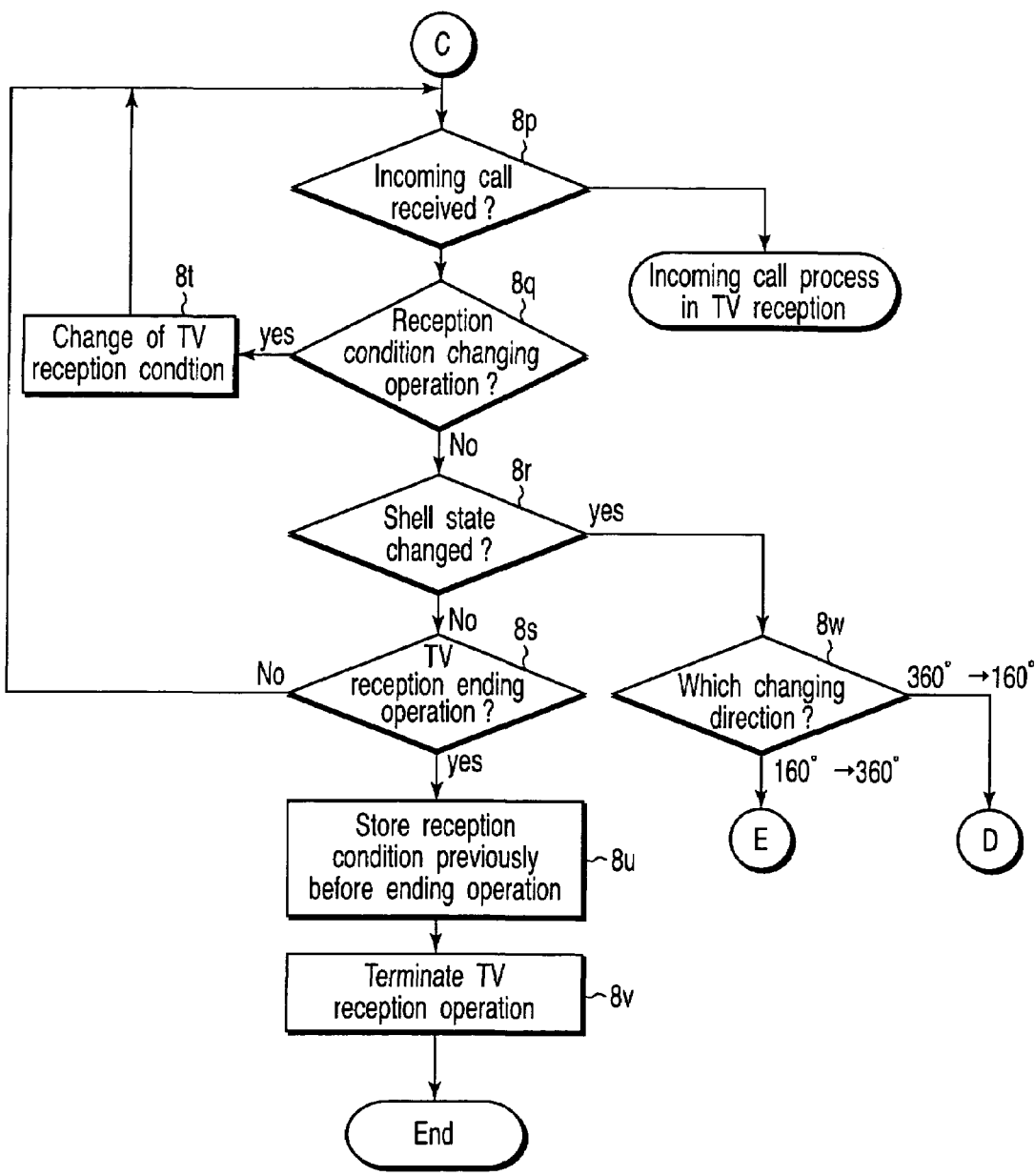
FIG. 8 is a flowchart showing the second half of a procedure and contents of the television reception/display control performed by the portable telephone shown in FIG. 6.

Next, the reception/display operation of the television video signal performed by the mobile telephone as described above will be described. FIGS. 7 and 8 show flowcharts showing a control procedure and control contents by the control unit 23.

In the state (the first state shown in FIGS. 1A and 1B) wherein the first and second shells 1 and 2 are closed with the main display 5a facing inside, the control unit 23 monitors the opening operation of the shells 1 and 2 in step 8a on the basis of the detection signals from the sensors 10a and 10b.

Assume that the user opens the first and second shells 1 and 2 in this state. When recognizing that the shells 1 and 2 are open on the basis of the detection signals from the sensors 10a and 10b, in step 8b, the control unit 23 checks whether the incoming call notification operation is performed. If the incoming call notification operation is performed, the control unit 23 determines that the shells 1 and 2 may be opened to respond to the incoming call, and the flow advances to the incoming call response process.

In contrast to this, if the incoming call notification operation is not performed, the control unit 23 checks the state of the shells 1 and 2 in step 8c. The state of the shells 1 and 2 is checked by the state checking function 23a on the basis of the detection signals from the sensors 10a to 10d. For example, when the detection signals from the sensors 10a and 10b and those from the sensors 10c and 10d are both low, the control unit 23 determines that the shells 1 and 2 is in the third state in FIGS. 2A and 2B, the fourth state in FIGS. 3A and 3B, or the fifth state in FIGS. 4A and 4B. However, since the shells 1 and 2 is not quite using in the fourth or fifth state, the state checking function 23a determines that the shells 1 and 2 is in the third state (e.g., 160° open state). In contrast to this, when the detection signals from the sensors 10a and 10b are low, and the detection signals from the sensors 10c and 10d are high, the state checking function 23a determines that the shells 1 and 2 is in the second state in FIGS. 5A and 5B, i.e., the state wherein the shells 1 and 2 overlaps each other with the main display 5a facing outside.

(1) Shell is Opened to Second State (360°)

First, the case wherein the state of the shells 1 and 2 is in the second state (open 360°) shown in FIGS. 5A and 5B after opening operation will be described.

In this case, the flow advances to step 8j, and the control unit 23 checks whether the activation mode is the manual or automatic activation mode. If the automatic activation mode is set as a result of this check, the control unit 23 checks in step 8k whether the reception display condition used in the previously preceding viewing is stored. If the previously preceding reception display condition is stored, the TV receiver 30 is activated in accordance with the stored reception display condition, and the TV display application program is activated, in step 8m. In contrast, when the previously preceding reception display condition is not stored, the TV receiver 30 is activated in accordance with the default value of the reception display condition set when shipped, and the TV display application program is activated, in step 8n. That is, when the automatic activation mode is set, the TV reception/display function is automatically activated by opening the shells 1 and 2 to obtain the 360° open state. Note that this previously preceding reception display condition includes a channel setting for each region, a volume setting of the previously preceding viewing, channel information of the previously preceding viewing, and the like.

Figure 9:
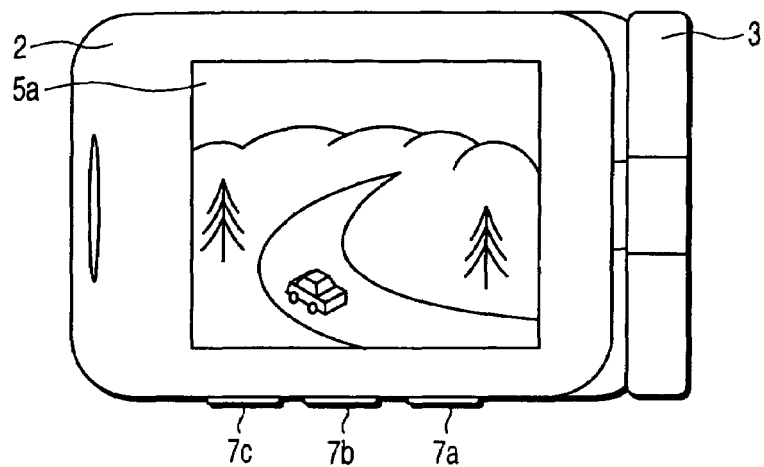
FIG. 9 is a view showing a display example of a television video signal in a full-screen display mode in accordance with the television reception/display control shown in FIG. 7.

Upon activating the TV receiver 30 and the TV display application program, the flow advances to step 8o, and the control unit 23 displays the TV video signal received by the TV receiver 30 on the main display 5a. In this case, the full-screen display mode is used as the display mode. That is, the full-screen display area of the main display 5a is set as the TV video display screen. Then, the display direction of the TV video signal may be so set as to match the main scanning direction of the TV video signal with the long-side direction of the full-screen display area. In this manner, the TV video signal may be displayed in a landscape mode by using the full-screen display area of the main display 5a. FIG. 9 shows an example of the display result.

Note that in the state wherein the TV video signal is displayed in the full-screen display area, the volume information and channel information are displayed on the TV video for a predetermined time (e.g., 2 sec) when the volume is adjusted or the channel is switched. Also, when the incoming call has received in the state wherein the TV video signal is displayed on the full-screen display area, the incoming call notification information (e.g., an icon) is displayed on the TV video.

In contrast, when the manual activation mode is set as the activation mode, the flow advances to step 8x, and the control unit 23 monitors the TV activating operation. When the user operates the TV key 7c in this state, the flow advances to step 8k, and the control unit 23 checks whether the reception display condition used in the previously preceding viewing is stored. In accordance with the check result, in step 8m or 8n, the TV receiver 30 and the TV display application program are activated. That is, the TV reception/display function is manually activated.

If in the manual activation mode is set as the activation mode, an electronic program application (not shown) may be activated, and the program may be selected in a state wherein the electronic program is displayed on the main display 5a by the application. The TV receiver 30 can be activated on the channel corresponding to the channel information of the selected program.

(2) Shell is Opened to Third State (160°)

Next, the case wherein the state of the shells 1 and 2 is in the third state (160° open) shown in FIGS. 2A and 2B will be described.

In this case, the flow advances to step 8d, and the control unit 23 displays a standby screen on the main display 5a, and monitors a menu selection operation. Assume that in this state, the user selects the menu, and selects the TV reception menu from a plurality of menu items. Thus, the control unit 23 checks the type of the selected menu in step 8f. If the selected menu is the TV reception menu, the TV receiver 30 and the TV display application program are activated in step 8g. Note that when the reception display condition used in the previously preceding viewing is stored, the TV receiver 30 and the TV display application program are activated in accordance with the stored reception display condition.

With this process, when the TV receiver 30 and the TV display application program are activated, the flow advances to step 8h, and the control unit 23 displays the TV video signal received by the TV receiver 30 on the main display 5a. In this case, the partial-screen display mode is used as the display mode.

Figure 10:
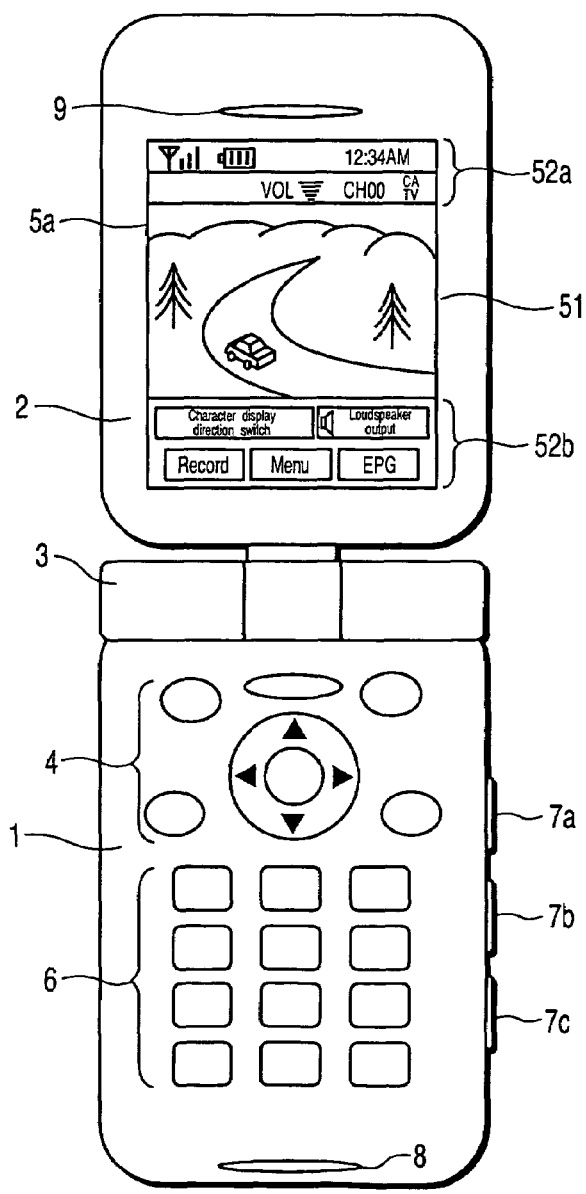
FIG. 10 is a view showing the display example of the television video signal in a partial-screen display mode in accordance with the television reception/display control shown in FIG. 7.

That is, as shown in FIG. 10, the TV video display area 51 is set about the center of the full-screen display area of the main display 5a in the vertical direction. Then, the display direction of the TV video signal may be set so as to match the main scanning direction of the TV video signal with the short-side direction of the full-screen display area. In this manner, the TV video signal is displayed on the TV video display area 51 set about the center of the full-screen display area.

Also, the control unit 23 sets the additional information display areas 52a and 52b on the upper and lower portions on the full-screen display area of the main display 5a in step 8i. The pictorial information and guide information are displayed in the additional information display areas 52a and 52b. As the pictorial information, as shown in FIG. 10, information representing a reception field strength, the remaining battery life, and the present time are displayed. Also, as the guide information, a plurality of menu items corresponding to the TV reception are displayed in addition to volume information and channel information. As shown in FIG. 10, this menu items include "record", "menu", "EPG", "character display vertical/horizontal direction switching", and "loudspeaker output".

(3) Various Operations During TV Reception Display Operation

During the TV reception display operation, the control unit 23 also executes the following process. FIG. 8 is a flowchart showing a control procedure and control contents.

That is, while monitoring the reception of incoming call in step 8p, the control unit 23 monitors the changing operation of the reception display condition in step 8q, and the change of the state of the shells 1 and 2 in step 8r. Also, the control unit 23 monitors a TV reception ending operation in step 8s. When the reception display condition such as the volume and channel is changed in this state, the control unit 23 changes the reception display condition in accordance with the changing operation in step 8t.

Alternatively, assume that the change of the state of the shells 1 and 2 is detected. The change of the state is detected on the basis of the detection signals from the sensors 10a to 10d. In this case, the flow advances to step 8w, and the control unit 23 checks the state changing direction. If the changing direction of the shells 1 and 2 is from 360° to 160°, the control unit 23 determines that the state of the shells 1 and 2 is changed from the second state in FIGS. 5A and 5B to the third state in FIGS. 2A and 2B. Then, the flow advances to steps 8h and 8i, and the display control is performed in the partial-screen display mode.

That is, in step 8h, the TV video display area 51 is set at the center in the vertical direction in the display area of the main display 5a, and the TV video signal is displayed in the landscape mode in the TV video display area 51. Additionally, in step 8i, the additional information display areas 52a and 52b are set in the upper and lower parts of the full-screen display area of the main display 5a, and the pictorial information and the guide information are displayed in these additional information display areas 52*a* and 52*b*.

In other words, when the state of the shells 1 and 2 changes from the second state in FIGS. 5A and 5B to the third state in FIGS. 2A and 2B, the display mode of the TV video signal in the main display 5*a* is switched from the full-screen display mode to the partial-screen display mode, and the display direction of the TV video signal changed from the long side to the short side. Also, the pictorial information representing the reception field strength and the residual amount of the battery, the information representing the volume and channel, and the plurality of menu items corresponding to TV reception are displayed in the additional information display areas 52*a* and 52*b*.

Alternatively, assume that the state of the shells 1 and 2 changes from 160° to 360°. In this case, the control unit 23 determines that the state of the shells 1 and 2 changes from the third state in FIGS. 2A and 2B to the second state in FIGS. 5A and 5B. The flow advances to step 8*o* in FIG. 7, and the control unit 23 performs the display control in the full-screen display mode. That is, the full-screen display area of the main display 5*a* may be set as the TV video display screen. Then, the display direction of the TV video signal may be so set as to match the main scanning direction of the TV video signal with the long-side direction of the full-screen display area.

Therefore, when the state of the shells 1 and 2 is changed from 160°to 360°, the direction of the TV video signal may be changed from the short side to the long side in the main display 5*a*, and displayed in the full-screen display area of the main display 5*a*.

When the TV reception ending operation is complete, the flow advances from step 8*s* to step 8*u*, and the control unit 23 stores the reception display condition of the previously preceding operation in the memory of the control unit 23. The TV display application program is ended in step 8*v*, and then the operation of the TV receiver 30 is stopped. The reception display condition stored in the memory of the control unit 23 is used as an initial operation condition for activating the TV receiver 30 and the TV display application program in the next activating operation of the TV reception/display function.

Note that when an incoming call is received during the TV reception display operation, the following process is performed. The incoming call includes the reception of an incoming call and e-mail.

That is, when the incoming call is received during the TV reception display operation, the control unit 23 checks whether the current state of the shells 1 and 2 is in the third state (160° open), or in the second state (360° open). When the result indicates that the state of the shells 1 and 2 is in the third state (160° open), a message or icon (incoming call notification information) representing the reception of the incoming call is displayed in the additional information display area 52*a* of the main display 5*a*. After a predetermined time (e.g., 2 seconds) from the display of this incoming call notification information, a caller name may be displayed in the additional information display area 52*a*. Note that this caller name can be displayed by reading out a corresponding caller information from a phone book memory in the memory unit 24 on the basis of a caller phone number or address included in the incoming call data. After that, the incoming call notification information and the caller name may be displayed alternately every 2 seconds.

Assume that the state of the shells 1 and 2 is in the second state (360° open). The control unit 23 checks whether an incoming message recording area set in the memory unit 24 has a free storage area. If the incoming message recording area does not have any free area, the control unit 23 may generate the display data (incoming call notification data) of a message or icon representing the reception of the incoming call. The generated incoming call notification data is displayed on the TV video data in the main display 5*a*. After a predetermined time (e.g., 2 seconds) from the display of the incoming call notification information, the caller name may be displayed, and the incoming call notification information and the caller name may be displayed alternately every 2 sec as in the case wherein the shells are open 160°.

When the state of the shells 1 and 2 is in the second state (360° open), and a free area is provided in the incoming message recording area, the incoming message recording process is performed. That is, the display data of the message or icon representing the reception of the incoming call may be displayed on the displayed TV video data in the main display 5*a*. After a predetermined time (e.g., 2 seconds) from the display of the display data, the caller name may be displayed. Then, after a predetermined time (e.g., 2 seconds) from the display of the caller name, the guide information for the incoming message recording operation may be generated, and the generated guide information is displayed on the TV video data in the main display 5*a*. After that, the incoming call notification information, the caller name, and the guide information for the incoming message recording operation may be repeated in turn every 2 seconds. Note that the guide information may be displayed by using the icon.

Assume that the user continuously presses a side key 7*b* for a predetermined time, i.e., performs long key pressing for the side key 7*b* in the state wherein the display operations are repeated. The control unit 23 transmits the guidance message prompting the caller to incoming message recording of the message after the response process, by using an automatic answering control function (not shown). Then, the message transmitted from the caller is stored in the incoming message recording area of the memory unit 24.

Note that the present invention is not limited to the above-described embodiment. For example, in this embodiment, the mobile telephone employs the articulated hinge mechanism 3. However, the present invention can be applied to the portable terminal which employs a uniaxial type hinge mechanism which can pivot 360° in one direction.

In this embodiment, the TV reception display operation is exemplified. However, the present invention can be applied to the video contents which are stored in the memory unit to be read out and displayed. For example, when it is detected that the shells 1 and 2 is in the second state (360° open), the control unit 23 reads the video content from the memory card 28 via the external memory interface 27. After decoding the video contents, the decoded video contents are displayed in the full-screen display area of the main display 5*a* as shown in FIG. 9.

When the shells 1 and 2 is in the third state (160° open) as shown in FIG. 10, the decoded video contents are displayed in the partial display area 51 of the main display 5*a*. Additionally, the pictorial information representing the operation state of the mobile telephone, and the guide information corresponding to the playback operation of the video contents are displayed in the additional information display areas 52*a* and 52*b* of the main display 5*a*.

Note that the video content may be displayed by being read from not only the external memory such as the memory card 28 but also the memory unit 24.

Also, in this embodiment, the display area of the main display 5*a* is separated into the TV video display area 51 and the additional information display areas 52*a* and 52*b* in the third state (160° open). However, the present invention is not limited to this. The full-screen display mode for displaying the TV video signal in the full-screen display area of the main display 5a is prepared in addition to the partial-screen display mode, to selectively use the partial-screen and full-screen display modes in accordance with the user's selection.

In addition to this, the type and arrangement of the portable terminal, the shape of the display for displaying the TV video signal, the position and size of the TV video display area 51 and the additional information display areas 52a and 52b, the type and display form of the pictorial information and the guide information in the additional information display areas 52a and 52b, and the like, can be variously modified when practiced without departing from the spirit and scope of the present invention.

In conclusion, the present invention is not directly limited to the above embodiment, but can be implemented, when practiced, by modifying the constituent elements without departing from the spirit and scope of the invention. Also, various inventions can be formed by appropriately combining a plurality of constituent elements disclosed in the embodiment. For example, some of all the constituent elements disclosed in the embodiment may also be deleted. Furthermore, constituent elements over different embodiments may also be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable telephone terminal which pivotally connects a first housing via a connection mechanism to a second housing having a display, comprising:
    a control unit which detects states of the portable terminal, wherein the states include a first state in which the first and second housings overlap each other with the display facing inside, a second state in which the first and second housings overlap each other with the display facing outside, and a third state in which the display is exposed in an intermediate state between the first state and the second state;
    a first display control unit configured to automatically actively display video signals which are one of: (i) received by a television receiver embedded in the terminal, and (ii) read out from a memory unit of the terminal, in a full-screen display area of the display when the control unit detects the second state; and
    a second display control unit configured to automatically actively display video signals which are one of: (i) received by the television receiver embedded in the terminal, and (ii) read out from the memory unit of the terminal, in a limited first partial-screen display area of the display when the control unit detects the third state.

2. The portable telephone terminal according to claim 1, further comprising a third display control unit configured to automatically display additional information in a second partial-screen display area which is separate from at least the first partial-screen display area of the display when the control unit detects the third state.

3. The portable telephone terminal according to claim 2, wherein:
    the full-screen display area of the display is rectangular, and
    the first display control unit sets a display direction such that a main scanning direction of the displayed video signals matches with a long-side direction of the full-screen display area of the display when the video signals are displayed in the full-screen display area of the display.

4. The portable telephone terminal according to claim 2, wherein:
    the full-screen display area of the display is rectangular ,and
    the second display control unit sets a display direction such that a main scanning direction of the displayed video signals matches with a short-side direction of the full-screen display area of the display when the video signals are displayed in the first partial-screen display area of the display.

5. The portable telephone terminal according to claim 2, wherein the second display control unit includes:
    setting means for setting a partial-screen display mode of displaying the video signals in the first partial-screen display area, and a full-screen display mode of displaying the video signals in the full-screen display area, in accordance with a user's operation, and
    display means for displaying the video signals in the first partial-screen display area when the partial-screen display mode is set, and displaying the video signals in the full-screen display area when the full-screen display mode is set.

6. The portable telephone terminal according to claim 2, wherein the third display control unit displays at least one of guide information corresponding to a display operation of the video signals, and pictorial information corresponding to an operation state of the portable terminal in the second partial-screen display area.

7. The portable telephone terminal according to claim 1, wherein:
    the full-screen display area of the display is rectangular, and
    the first display control unit sets a display direction such that a main scanning direction of the displayed video signals matches with a long-side direction of the full-screen display area of the display when the video signals are displayed in the full-screen display area of the display.

8. The portable telephone terminal according to claim 1, wherein:
    the full-screen display area of the display is rectangular ,and
    the second display control unit sets a display direction such that a main scanning direction of the displayed video signals matches with a short-side direction of the full-screen display area of the display when the video signals are displayed in the first partial-screen display area of the display.

9. The portable telephone terminal according to claim 1, wherein the second display control unit includes:
    setting means for setting a partial-screen display mode of displaying the video signals in the first partial-screen display area, and a full-screen display mode of displaying the video signals in the full-screen display area, in accordance with a user's operation, and
    display means for displaying the video signals in the first partial-screen display area when the partial-screen display mode is set, and displaying the video signals in the full-screen display area when the full-screen display mode is set.

* * * * *